United States Patent [19]

Brown

[11] 4,225,101

[45] Sep. 30, 1980

[54] AIRCRAFT EJECTION SYSTEM COLLISION AVOIDANCE SYSTEM

[75] Inventor: Herbert R. Brown, Monroe County, N.Y.

[73] Assignee: The United States of America as represented by the Secretary of the Air Force, Washington, D.C.

[21] Appl. No.: 2,163

[22] Filed: Jan. 9, 1979

[51] Int. Cl.³ .............................................. B64D 25/10
[52] U.S. Cl. ........................ 244/122 AE; 244/122 AH; 244/141
[58] Field of Search ........ 244/122 R, 122 A, 122 AB, 244/122 AC, 122 AD, 122 AE, 122 AH, 122 AG, 141, 147

[56] References Cited

U.S. PATENT DOCUMENTS

| | | |
|---|---|---|
| 3,311,330 | 3/1967 | Hofferberth et al. ................. 244/141 |
| 3,416,755 | 12/1968 | Knoll et al. ....................... 244/122 R |
| 3,862,731 | 1/1975 | McIntyre .............................. 244/141 |

*Primary Examiner*—Charles E. Frankfort
*Attorney, Agent, or Firm*—Joseph E. Rusz; Richard J. Killoren

[57] ABSTRACT

A collision avoidance system having a seat parachute deployment system secured to the pilot's seat. The seat parachute deployment system has a flap member secured to the survival kit on the side remote from the pilot. The flap member drops down to prevent entanglement of the seat parachute or suspension lines with the pilot's legs. The seat parachute is stowed in an elongated sleeve on the flap and is drawn from the sleeve during seat separation. The suspension lines are stowed in a conventional manner. A connecting line, connected between the suspension lines and seat attachment lines, is stowed in elongated sleeves on the flap.

3 Claims, 5 Drawing Figures

AIRCRAFT EJECTION SYSTEM COLLISION AVOIDANCE SYSTEM

RIGHTS OF THE GOVERNMENT

The invention described herein may be manufactured and used by or for the Government of the United States for all governmental purposes without the payment of any royalty.

BACKGROUND OF THE INVENTION

This invention relates to a parachute collision avoidance system in an emergency aircraft ejection system.

The problem of collision between a crewmember and the ejection seat, and between the ejection seat and a subsequently ejected crewmember, exists in emergency aircraft ejection systems.

Various systems have been devised to overcome these collision problems. In some of the early ejection systems wherein the crewmember's parachute was deployed after seat separation, parachutes have been used for seat stabilization prior to seat separation and for aiding in the separation of the crewmember from the seat. These parachutes, if used where multiple ejections are employed, would also inherently retard the seat to aid in the avoidance of collisions between the seat and a subsequently ejected crewmember.

Due to the need for more rapid deployment of the crewmember's parachute, systems are needed which permit the recovery of crewmembers under a larger range of adverse conditions and at lower altitudes. Ejection systems have been devised wherein the crewmember's parachute is deployed before seat separation. Conventional parachutes, provided to aid in seat separation, cannot be used in these systems due to the problem of entanglement between the two parachutes. In these systems which use seat stabilization parachutes, the seat stabilization parachute must be cut loose prior to deployment of the crewmember's parachute to avoid parachute entanglement problems. With the parachute cut loose prior to the deployment of the crewmember's parachute, the inherent seat retardation, to prevent collision between the seat and subsequently ejected crewmember, is lost.

With the continuing requirements for reducing sequencing time delays in the recovery of crewmembers, from aircraft which are in adverse altitudes at the time of egress initiation, some means is needed for reducing the collision problems in emergency ejection systems which use crewmember parachute deployment prior to seat separation.

BRIEF SUMMARY OF THE INVENTION

According to this invention, in systems which use crewmember parachute deployment prior to seat separation or wherein the seat retardation parachute is cut loose from the seat prior to crewmember parachute deployment, the potential for collision, between the ejection seat and a subsequently ejected crewmember, is substantially reduced by providing an elongated deployment sleeve member, for the seat parachute, which is secured to the underside of the crewmember's survival kit. The sleeve member is locked in place in the seat with the survival kit until after the crewmember has been separated from the seat. Since the sleeve member is physically attached to the survival kit, the parachute is forcefully deployed after the crewmember's parachute has deployed and the crewmember has separated from the seat.

IN THE DRAWINGS

DETAILED DESCRIPTION OF THE INVENTION

Figure 1:
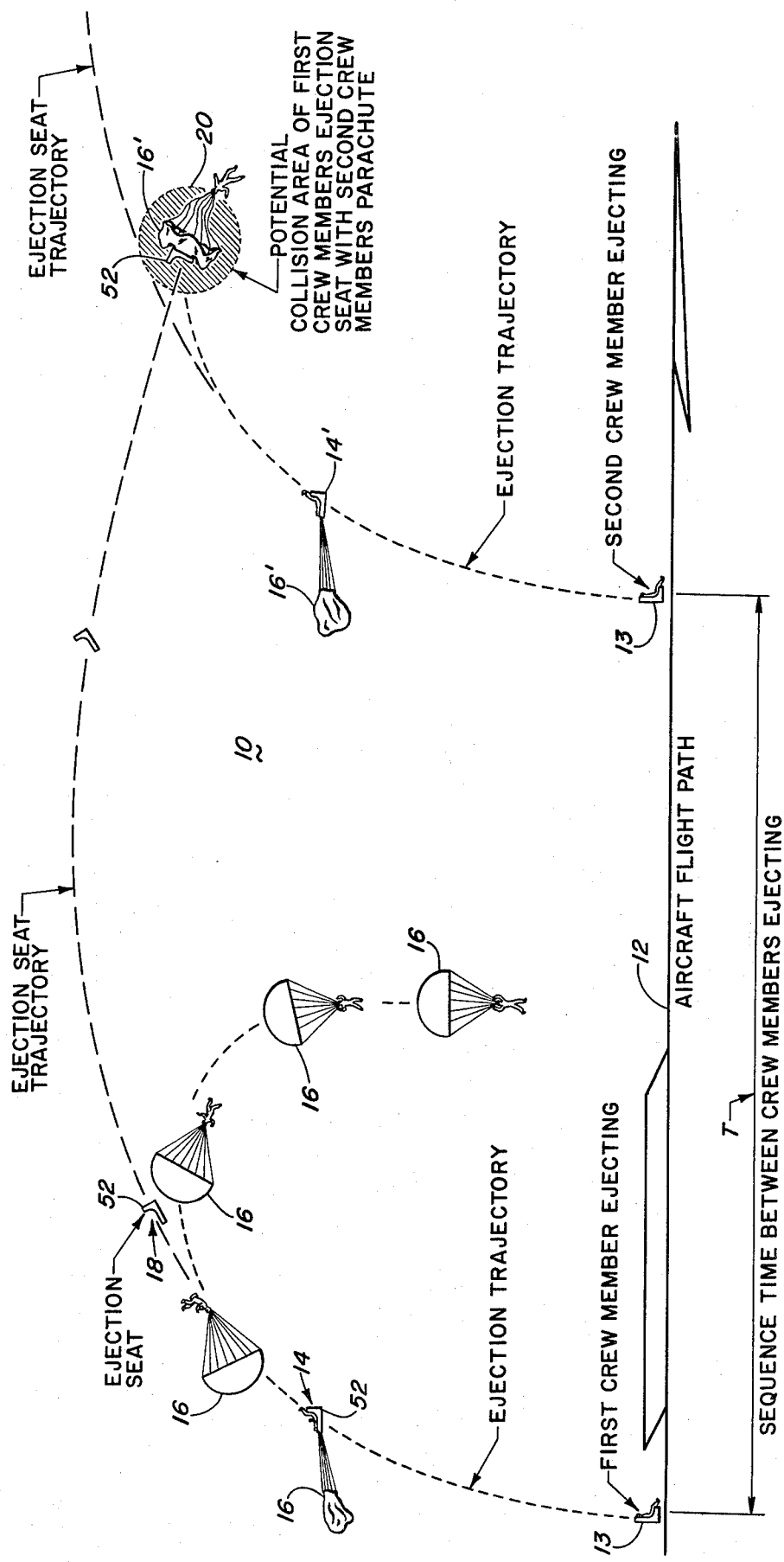
FIG. 1 is a crewmember ejection sequence diagram showing the collision potential when seat parachutes are not provided.

Reference is now made to FIG. 1 of the drawing which shows a crewmember ejection sequence diagram 10 wherein the flight path of the aircraft is indicated by the arrow 12. The sequence time between the ejcetion of the first crewmember ejection seat system 13 and the ejection of the second crewmember ejection seat system 13 is shown at T. As shown at 14 in FIG. 1 the pilot's parachute 16 is deployed before seat separation. With no seat parachute provided after seat separation, indicated at 18, there is a potential for a collision between the seat for one crewmember and the parachute of a subsequently ejected crewmember, as shown at 20 in FIG. 1. It is also possible that the seat of one crewmember could collide with the subsequently ejected crewmember.

Figure 2:
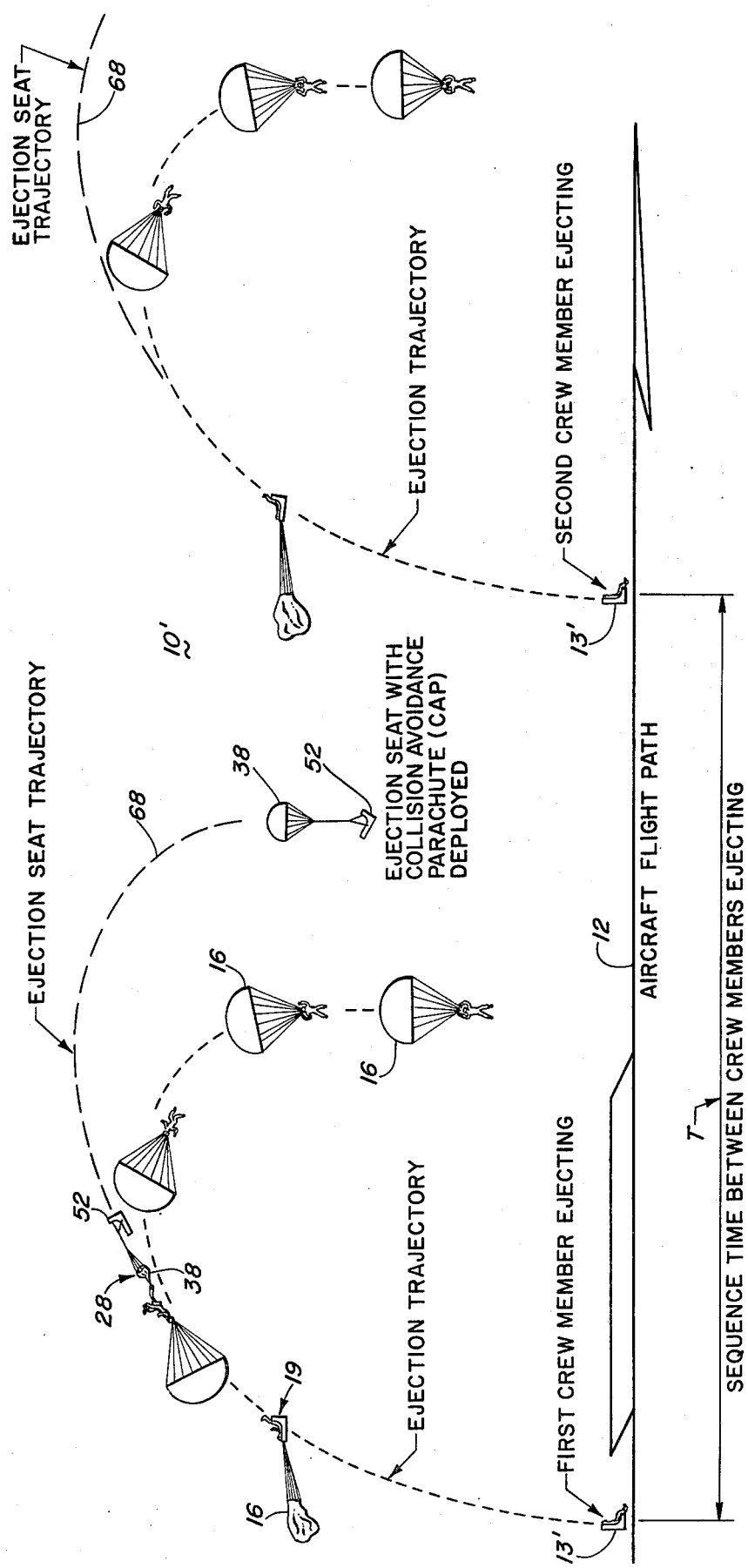
FIG. 2 is a crewmember ejection sequence diagram wherein the seat parachute deployment of the invention is used.

To avoid the collision potential, between a seat of one crewmember and a subsequently ejected crewmember or his parachute, an ejection seat system 13' is provided wherein a seat parachute 38 is deployed as shown at 28 in the sequence diagram 10' in FIG 2. With the seat parachute deployed after seat separation and after the pilot's parachute is fully deployed, both the problem of entanglement and the problem of collision with the subsequently ejected crewmembers are overcome.

Figure 3:
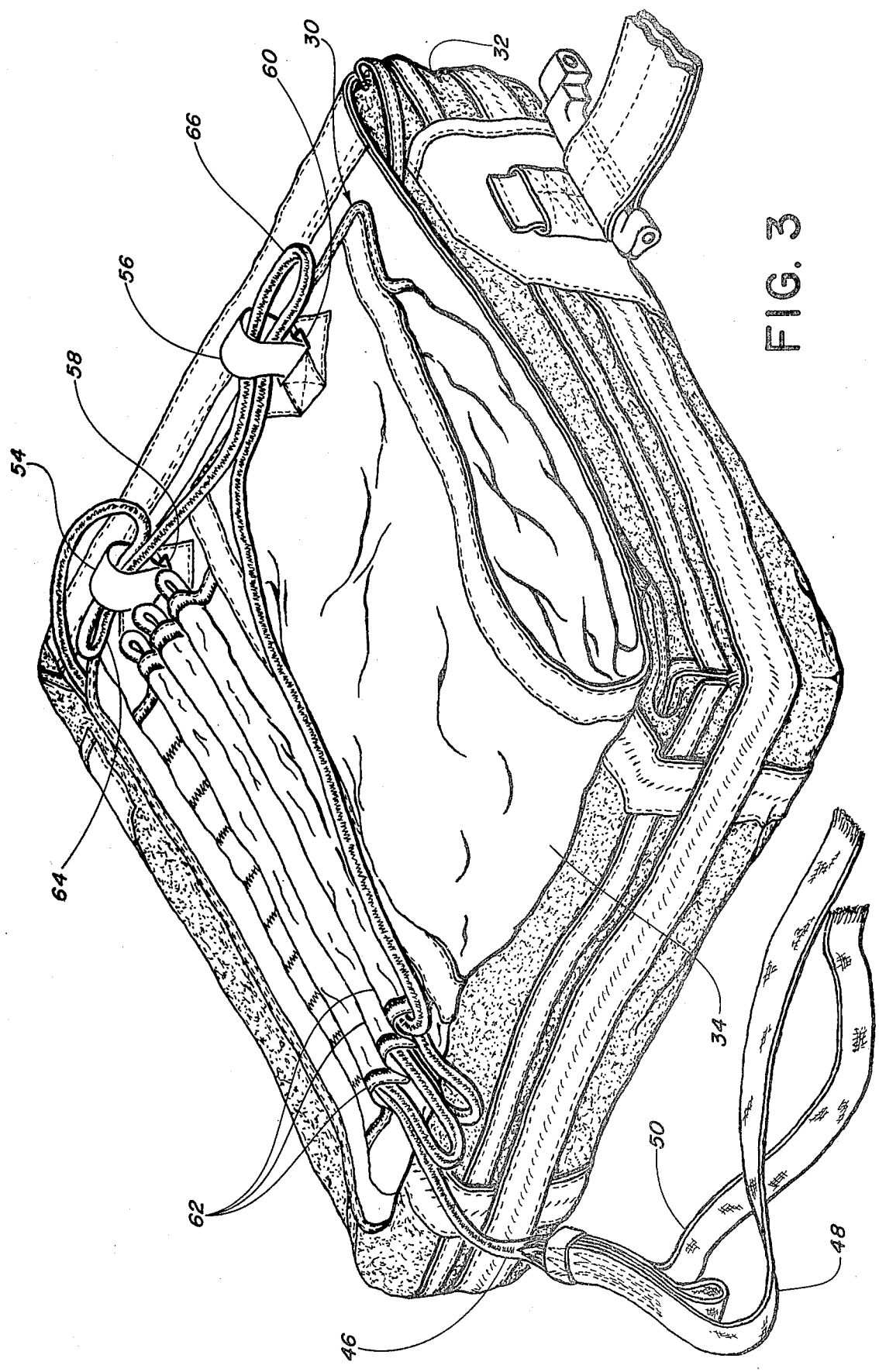
FIG. 3 shows the seat parachute deployment system of the invention attached to the pilot's survival kit.
Figure 4:
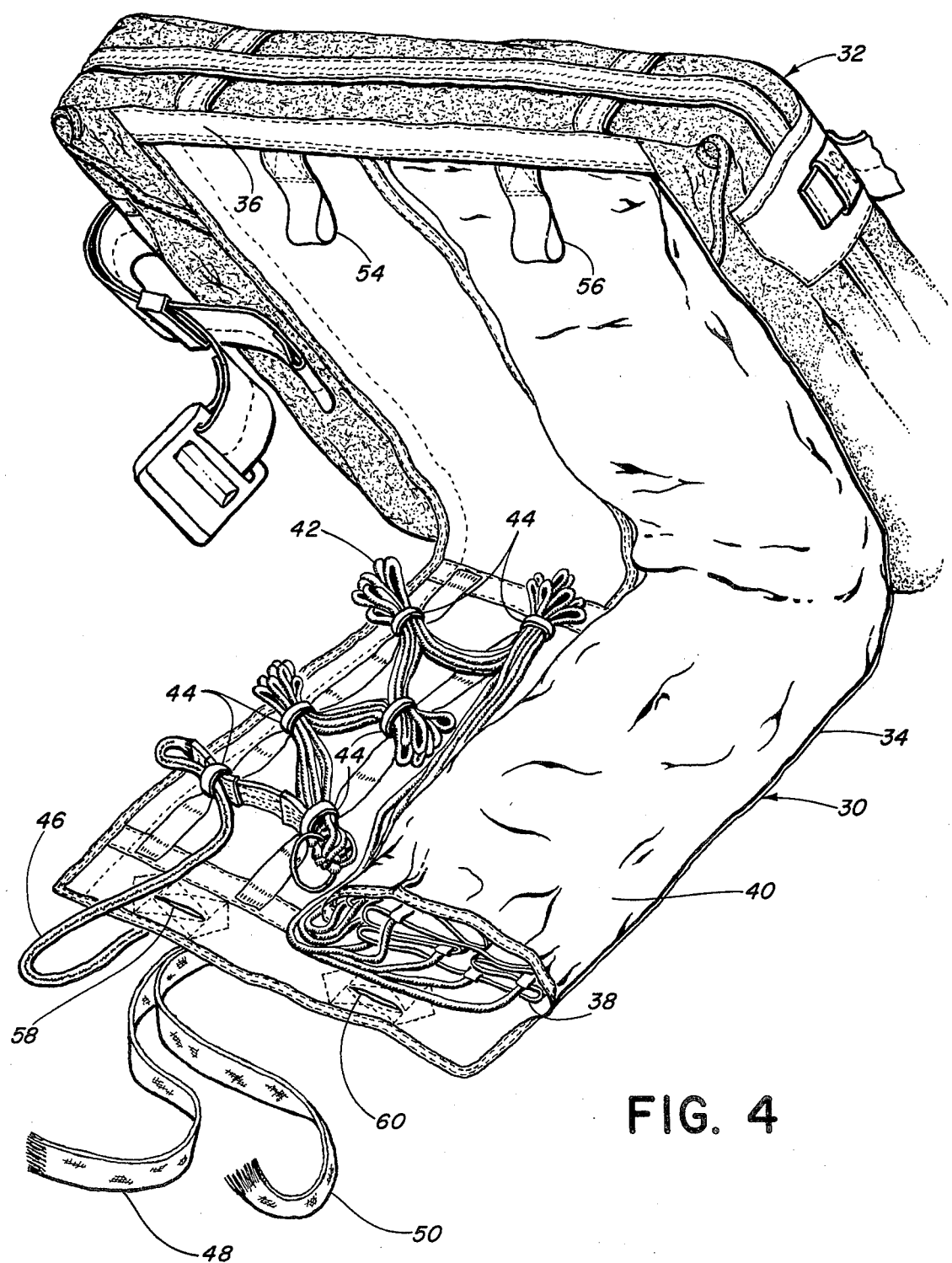
FIG. 4 shows the seat parachute deployment system of FIG. 3 in a partially open condition.
Figure 5:
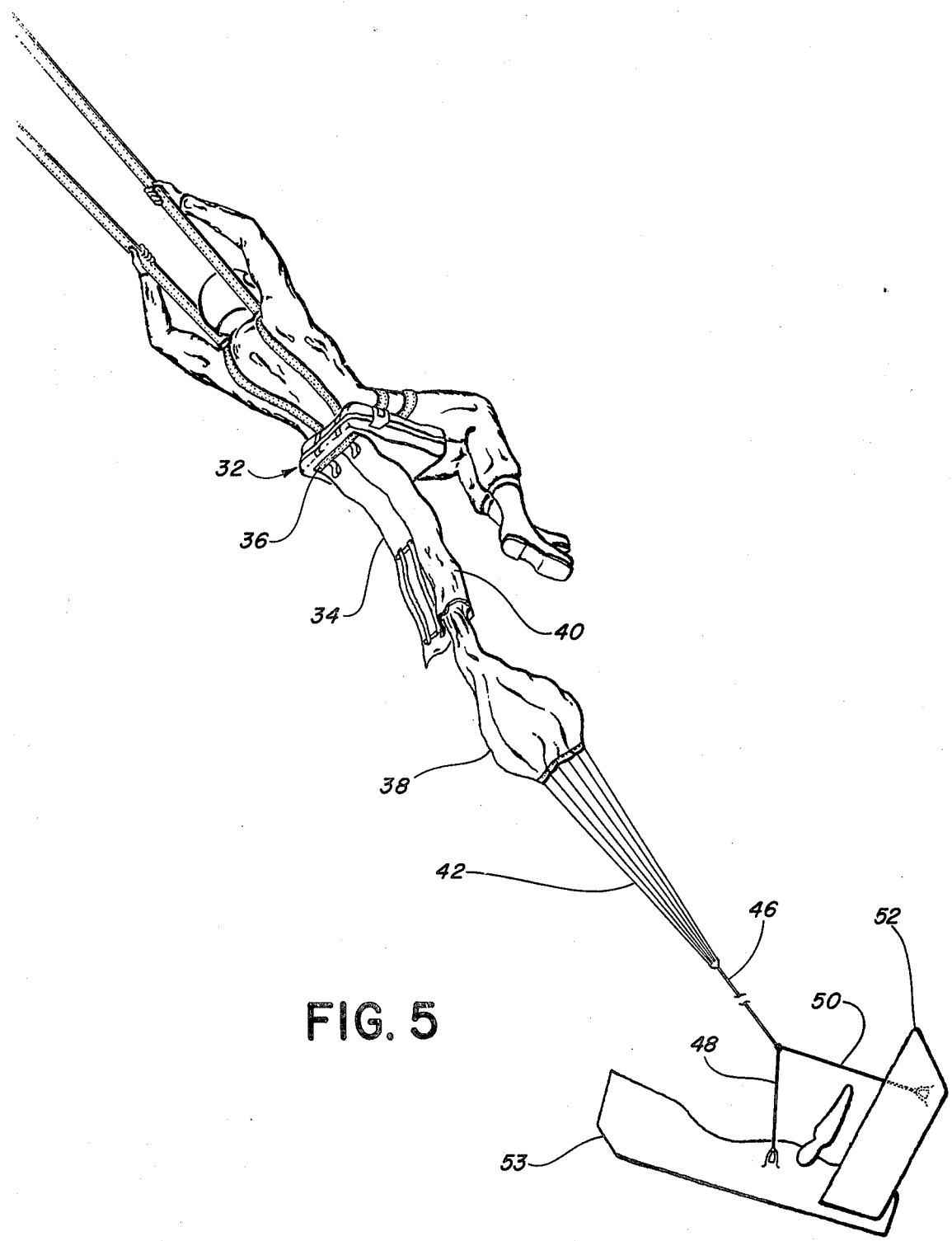
FIG. 5 is a partially schematic drawing illustrating the deployment of the seat parachute after seat separation.

To provide for seat parachute deployment after seat separation, a seat parachute deployment system 30 is secured to the pilot's survival kit 32 as shown in FIGS. 3, 4 and 5. The seat parachute deployment system includes a flap member 34 which is secured at 36 to the survival kit 32 on the side remote from the pilot as shown in FIGS. 4 and 5. The seat parachute 38 is stowed in a sleeve member 40. The suspension lines 42 are secured in elastic holders 44 in a conventional manner. The suspension lines 42 are secured to the connecting line 46. The connecting line 46 is also secured to the seat attachment lines 48 and 50 which are connected to ejection seat 52.

In the stowed condition, shown in FIG. 3, elastic loops 54 and 56 pass through slots 58 and 60 in the flap member 34. The connecting line 46 is stowed in elongated sleeve members 62 as shown in FIG. 3. Loops 64 and 66 are formed in connecting line 46 and pass through loops 54 and 56 to hold the flap 34 in place adjacent the survival kit 32. The survival kit 32 is stowed beneath the pilot's cushion in the ejection seat 52 in a conventional manner with the parachute deployment system being positioned, in the seat, below the survival kit.

In the operation of the device of the invention after the seat 52 is ejected from the aircraft and the pilot's parachute 16 has been deployed, seat separation takes place. As the pilot separates from the seat, connecting line 46 is drawn in from sleeves 62 and loops 54 and 56. With the loops 64 and 66 removed from the loops 54 and 56, loops 54 and 56 are drawn through slits 58 and 60 to permit the flap 34 to assume a position as shown in FIG. 5. As can be seen in FIG. 5, the parachute 38 is drawn from sleeve 40 on the side of the flap away from the pilot's legs to avoid the problem of entanglement of the parachute 38 or suspension lines 42 with the pilot's legs. After separation, the parachute 38 causes the seat 52 to descend as shown by trajectory line 68, in FIG. 2, which prevents the potential hazard shown in FIG. 1.

There is thus provided an ejection system collision avoidance system which permits more rapid deployment of the crewmember without the potential for collision of the ejection seat with subsequently ejected crewmembers or with their parachutes.

I claim:

1. In combination with an ejection seat system, for use in an aircraft emergency ejection system, wherein the crewmember parachute is deployed prior to seat separation; wherein a crewmember survival kit is stowed in the seat and is adapted to be secured to the crewmember and wherein the crewmember parachute aids in separating the crewmember from the ejection seat; a seat retardation parachute system, comprising: an ejection seat parachute including a parachute canopy; means for securing the parachute canopy to the ejection seat; means adapted to be connected to the crewmember and the ejection seat parachute, for deploying the ejection seat parachute after separation of the crewmember from the ejection seat; said means for deploying the ejection seat parachute including a folding flap member attached to the crewmember survival kit on the side remote from the side adapted to be positioned adjacent the crewmember, releasable means for holding said flap member in its folded condition; said flap member, after release, being adapted to drop down with one side adjacent the legs of the crewmember; an elongated sleeve on the side of the flap adapted to be positioned remote from the legs of the crewmember; said ejection seat parachute canopy being stowed in said elongated sleeve prior to seat separation.

2. The device as recited in claim 1 wherein said means for securing the parachute canopy to the ejection seat include a pair of attachment lines connected to the ejection seat; a plurality of suspension lines connected to said parachute canopy; a connecting line secured to said suspension lines and said attachment lines; means, secured to said flap member adjacent the elongated sleeve member, for holding said suspension lines in stowed position and means on said flap member on the side remote from said suspension line holding means for holding said connecting line in a stowed position.

3. The device as recited in claim 2 wherein said means for holding the connecting line includes a plurality of elongated sleeve members attached to the flap member.